United States Patent
Llamas et al.

(10) Patent No.: US 10,002,031 B2
(45) Date of Patent: Jun. 19, 2018

(54) LOW OVERHEAD THREAD SYNCHRONIZATION USING HARDWARE-ACCELERATED BOUNDED CIRCULAR QUEUES

(71) Applicant: NVIDIA CORPORATION, Santa Clara, CA (US)

(72) Inventors: Ignacio Llamas, Sunnyvale, CA (US); James David Balfour, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 414 days.

(21) Appl. No.: 13/890,009

(22) Filed: May 8, 2013

(65) Prior Publication Data
US 2014/0337848 A1   Nov. 13, 2014

(51) Int. Cl.
*G06F 9/46* (2006.01)
*G06F 9/52* (2006.01)

(52) U.S. Cl.
CPC ...................................... *G06F 9/52* (2013.01)

(58) Field of Classification Search
CPC .................................................... G06F 9/4881
USPC ............................................................ 718/104
See application file for complete search history.

(56) References Cited

U.S. PATENT DOCUMENTS

| | | | | |
|---|---|---|---|---|
| 5,598,562 A * | 1/1997 | Cutler | .................... | G06F 9/4428 711/E12.097 |
| 5,706,515 A * | 1/1998 | Connelly | .................. | G06F 9/50 710/200 |
| 6,128,640 A * | 10/2000 | Kleinman | ............. | G06F 9/4812 718/102 |
| 6,941,379 B1 * | 9/2005 | Dingsor | ................ | G06F 9/5027 709/230 |
| 7,117,496 B1 * | 10/2006 | Ramesh | ..................... | G06F 9/52 718/102 |
| 7,543,136 B1 * | 6/2009 | Coon | ................... | G06F 9/30181 712/228 |
| 8,806,096 B1 * | 8/2014 | Patil | ....................... | G06F 3/0689 710/74 |
| 2002/0124241 A1 * | 9/2002 | Grey | ........................ | G06F 9/52 717/149 |
| 2008/0109807 A1 * | 5/2008 | Rosenbluth | ............. | G06F 9/526 718/102 |
| 2008/0118065 A1 * | 5/2008 | Blaisdell | ............... | H04L 45/745 380/255 |
| 2008/0288496 A1 * | 11/2008 | Duggirala | ............... | G06F 9/526 |
| 2009/0037929 A1 * | 2/2009 | Shimko | ................. | G06F 21/606 719/312 |

(Continued)

OTHER PUBLICATIONS

Jekov: "Java Concurrency:Blocking queues. Jun. 24, 2008" "https://dzone.com/articles/javaconcurrencyblockingqueu".*

(Continued)

*Primary Examiner* — Mehran Kamran
(74) *Attorney, Agent, or Firm* — Artegis Law Group, LLC (57) ABSTRACT

A first thread is placed into a blocked state by causing the thread to perform a blocking pop operation on a hardware-accelerated, single-entry queue. When a synchronization event completes, a second thread may release the first thread from the blocked state pushing a data value onto the hardware accelerated, single-entry queue. The push operation satisfies the blocking pop operation, and the first thread is released.

24 Claims, 7 Drawing Sheets

(56) References Cited

U.S. PATENT DOCUMENTS

| | | | | |
|---|---|---|---|---|
| 2009/0300766 | A1* | 12/2009 | Toub | G06F 9/526 726/26 |
| 2009/0319996 | A1* | 12/2009 | Shafi | G06F 8/314 717/125 |
| 2010/0153655 | A1* | 6/2010 | Cypher | G06F 9/3851 711/139 |
| 2010/0299541 | A1* | 11/2010 | Ishikawa | G06F 1/3228 713/300 |
| 2011/0023032 | A1* | 1/2011 | Shorb | G06F 9/522 718/100 |
| 2012/0023502 | A1* | 1/2012 | Marr | G06F 9/4881 718/103 |
| 2012/0117323 | A1* | 5/2012 | Cypher | G06F 12/0855 711/118 |
| 2012/0131596 | A1* | 5/2012 | Lefebvre | G06F 9/52 718/106 |
| 2013/0014114 | A1* | 1/2013 | Nagata | G06F 9/52 718/102 |
| 2013/0145374 | A1* | 6/2013 | Sweeney | G06F 9/52 718/104 |
| 2013/0305258 | A1* | 11/2013 | Durant | G06F 9/4881 718/106 |
| 2013/0346989 | A1* | 12/2013 | Lam | G06F 9/542 718/102 |
| 2014/0101651 | A1* | 4/2014 | Li | G06F 8/67 717/171 |
| 2014/0245309 | A1* | 8/2014 | Otenko | G06F 9/546 718/102 |

OTHER PUBLICATIONS

Blocking Queue: "Java 2 Platform Standard Ed 5.0" Oracle Corporation, 2010. "https://doc.oracle.com/javase/1.5.0/docs/api/java/util/concurrent/BlockingQueue.html".*

Lee-HAQu-2011 "HAQu: Hardware-Accelerated Queueing for Fine-Grained Threading on a Chip Multiprocessor". 2011 IEEE 17th International Symposium on High Performance Computer Architecture. (Feb. 12-16, 2011)—pp. 99-110.*

* cited by examiner

LOW OVERHEAD THREAD SYNCHRONIZATION USING HARDWARE-ACCELERATED BOUNDED CIRCULAR QUEUES

BACKGROUND OF THE INVENTION

Field of the Invention

The present invention generally relates to multithreaded processing and, more specifically, to low overhead thread synchronization using hardware accelerated bounded circular queues.

Description of the Related Art

A conventional central processing unit (CPU) typically supports multithreaded processing and often provides various mechanisms for synchronizing concurrently executing threads, including mutexes and semaphores. However, a conventional parallel processing unit (PPU), such as a graphics processing unit (GPU), may not provide similar synchronization mechanisms as those commonly provided by a CPU. A conventional GPU implements a hardware scheduler that schedules threads for execution, but the hardware scheduler typically cannot cause threads to synchronize without rescheduling those threads. Although GPU hardware does support coarse synchronization mechanisms, including e.g. thread group-wide synchronization barriers, such approaches are not capable of synchronizing individual threads. Consequently, developers of multithreaded programs designed for execution on PPUs oftentimes rely on various workarounds in order to provide basic synchronization mechanisms.

One common workaround is to program a thread executing on a PPU to poll a conditional value in order to synchronize with another thread configured to update that conditional value. For example, a given thread that must wait for some other thread to exit before resuming processing could be programmed to wait to resume execution until that other thread modifies a particular register value. The given thread would then poll the register value and, upon detecting that the register value has been modified, resume processing. With this approach, the given thread and the other thread may synchronize their operations.

However, this solution suffers from two drawbacks. First, causing a thread to poll a register is typically power inefficient because the thread executes the same portion of code repeatedly to implement polling without accomplishing any useful work. Second, while continually polling, the thread retains control over various resources allocated to that thread, including arithmetic logic units (ALUs) and load-store units (LSUs), thereby preventing other threads from using those resources to perform useful work.

A possible optimization for the polling-based thread synchronization approach described above in the context of PPU-based multithreaded processing is to implement priority-based scheduling. With priority-based scheduling, a low-priority thread may be scheduled to "wake up" and poll a corresponding conditional value less frequently compared to other higher-priority threads. Such an approach may be slightly more power efficient than a polling procedure, such as that described above, but problems may arise if low-priority threads are continuously re-scheduled and never allowed to complete due to a continuous emergence of higher-priority threads. In these situations, system deadlock may occur.

As the foregoing illustrates, what is needed in the art is an improved technique for synchronizing threads executing on a PPU.

SUMMARY OF THE INVENTION

One embodiment of the present invention includes a computer-implemented method for synchronizing a first thread with one or more other threads, including determining that the one or more other threads should complete a synchronization event prior to the first thread completing execution, causing the first thread to execute a blocking pop operation on a first queue that is associated with the first thread, where the first thread enters a blocked state and pauses execution until the first queue completes the blocking pop operation, determining that the blocking pop operation has completed and returned a data value, where the blocking pop operation completes after the one or more threads have completed the synchronization event, and exiting the blocked state to resume execution of the first thread.

One advantage of the disclosed technique is that threads executing on a parallel processing unit may synchronize operations without consuming the excessive power and processing resources required by conventional synchronization mechanisms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
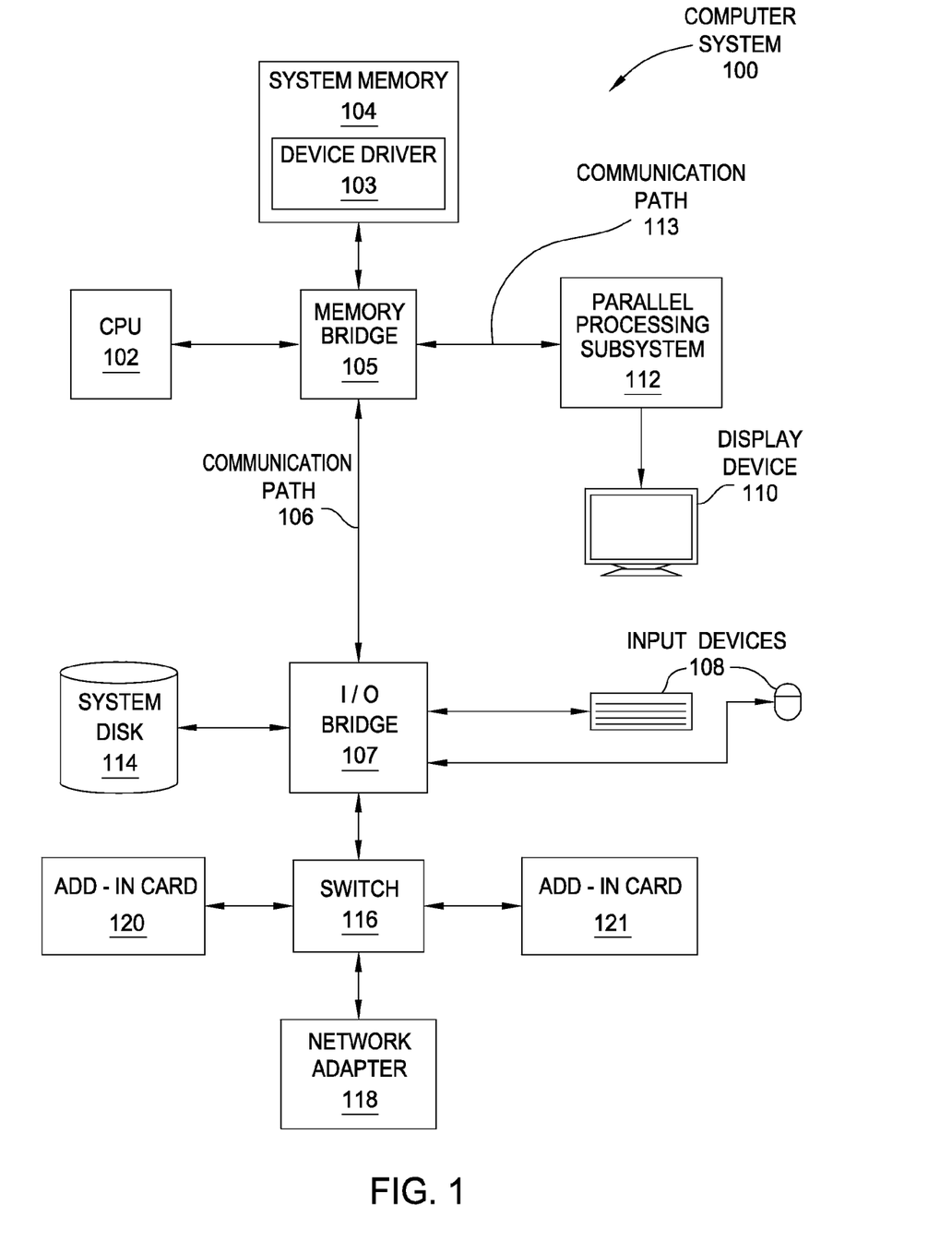
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
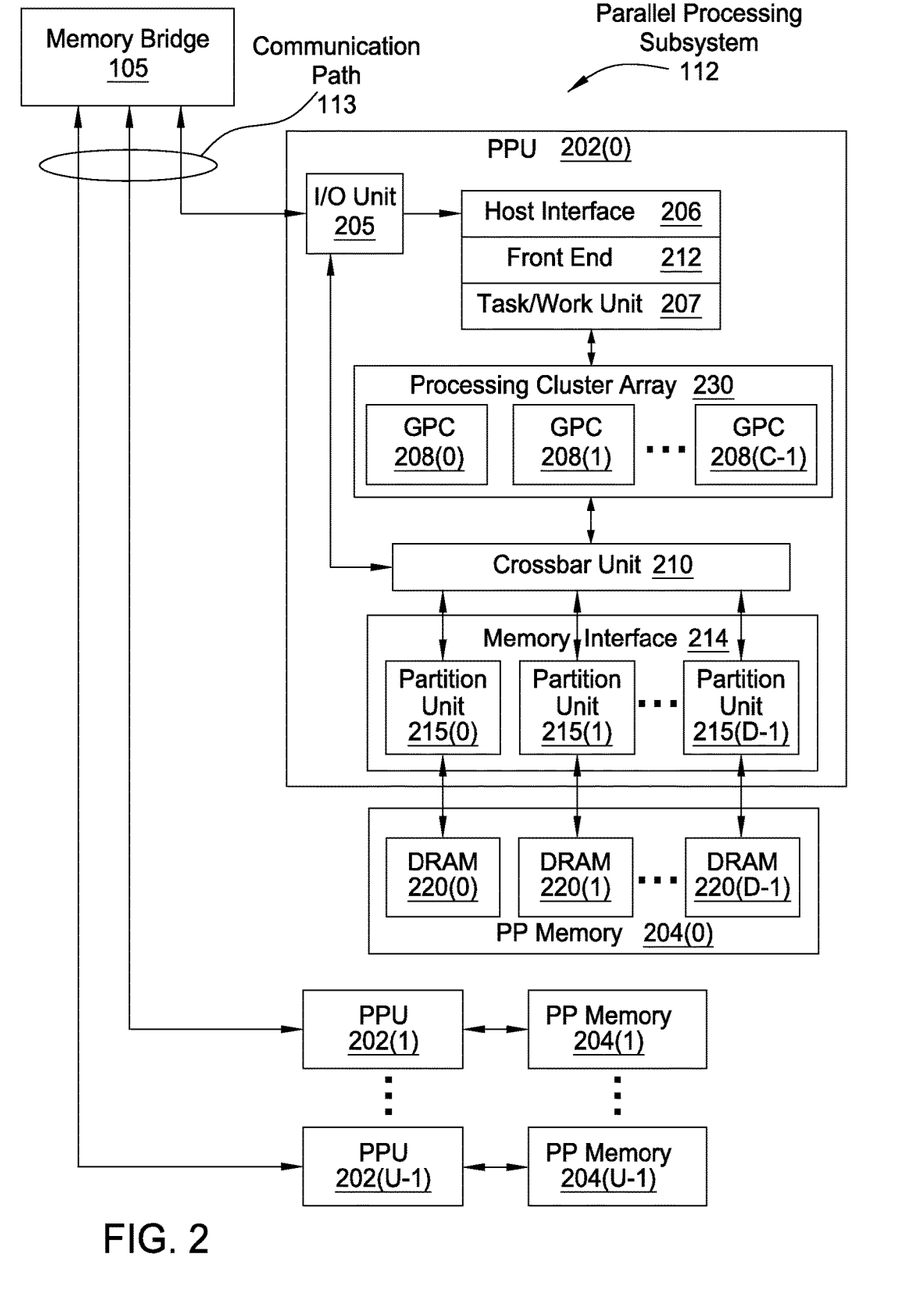
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
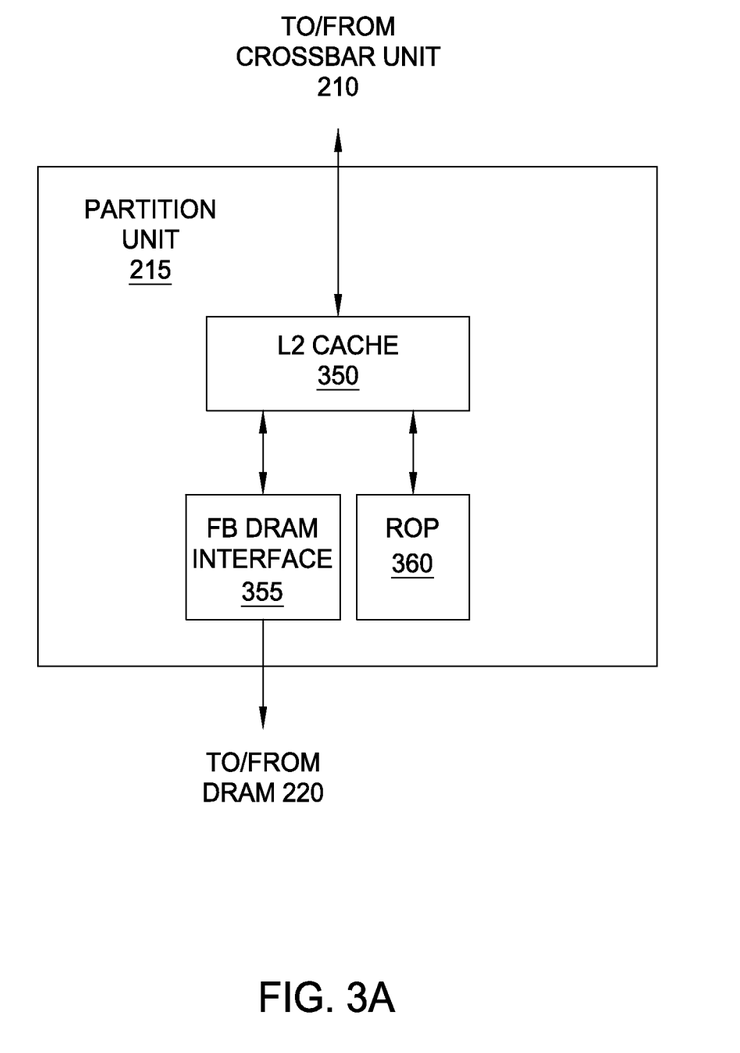
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
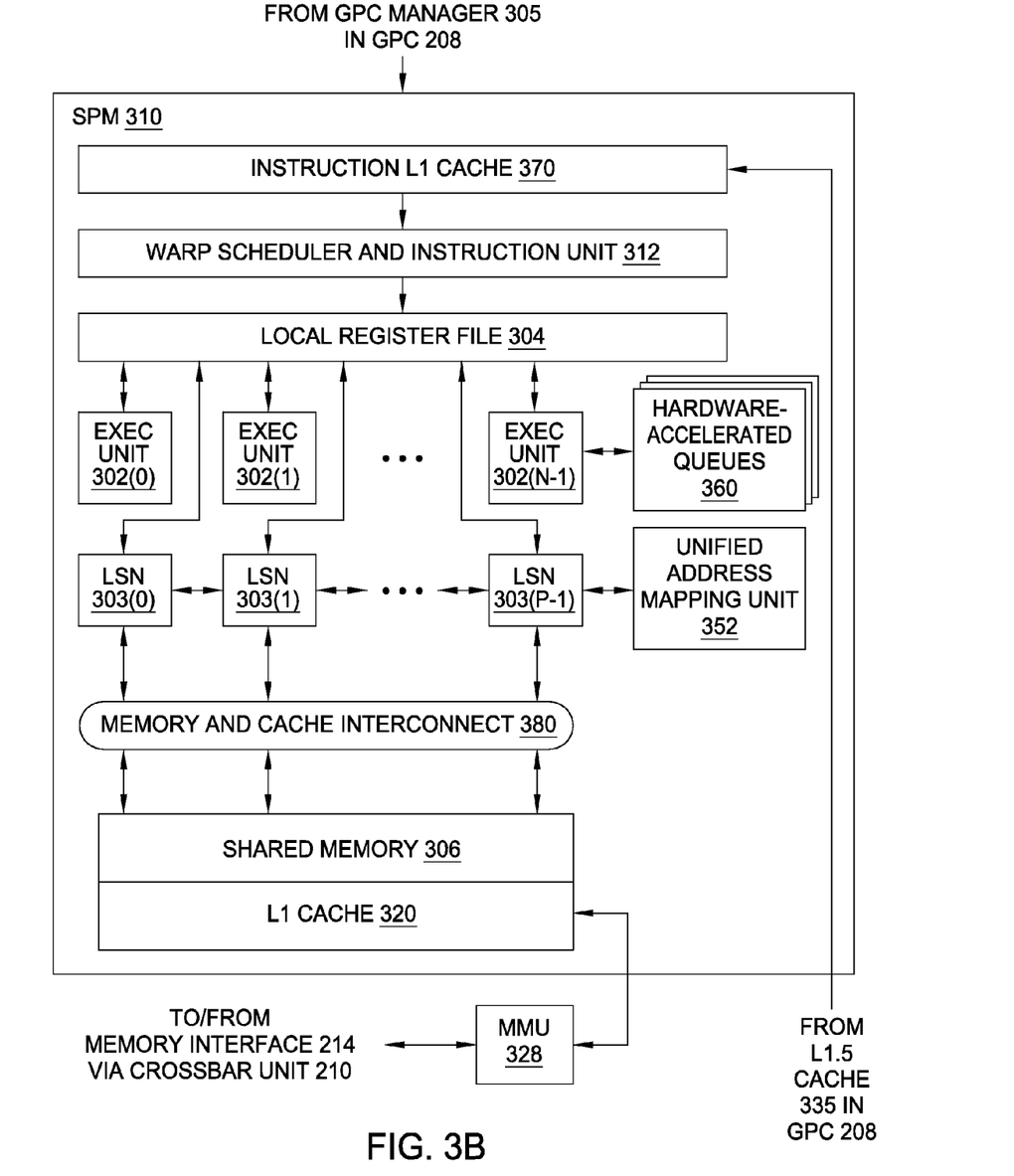
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMS) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Hardware accelerated queues 360 provide an additional resource that threads may utilize when executing on SM 310. Hardware accelerated queues 360 are bounded, circular buffers that may be populated with data, instructions, and so forth, based on a first-in, first-out (FIFO) policy. Hardware accelerated queues 360 may include any number of different queues and may be configured by a thread executing on SM 310. A given hardware accelerated queue 360 may include a sequence of records, including a "head" record and a "tail" record that represent the first record and the last record, respectively, in the sequence. Hardware accelerated queues 360 are configured to support a variety of different operations that may be executed by threads configured to access those queues.

One such operation, a GetNextHeadOrWait operation, causes a hardware accelerated queue 360 to return the head record associated with that queue, unless the queue is empty. This operation may also be referred to herein as a "blocking pop operation." When the hardware accelerated queue 360 is empty, the GetNextHeadOrWait operation is added to a request queue associated with that hardware accelerated queue 360 until the queue becomes non-empty. When the hardware accelerated queue 360 finally becomes non-empty, e.g. after a thread performs a CommitTail operation to add a record to the tail of the sequence of records, the hardware accelerated queue 360 may then return that record.

A thread that executes the GetNextHeadOrWait operation simply stalls until the GetNextHeadOrWait operation can be completed. Certain hardware resources associated with a thread that is stalled in this fashion may be de-allocated from the thread until the GetNextHeadOrWait operation can be completed. Upon completion of that operation, the in-memory state of the thread may be updated to indicate that the thread should be re-activated. The functionality of hardware accelerated queues 360 described thus far may be leveraged to implement a synchronization mechanism that allows threads executing on SM 310 to synchronize operations, as described in greater detail below in conjunction with FIGS. 4-6.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Low Overhead Thread Synchronization with Hardware Accelerated Bounded Queues

Figure 4:
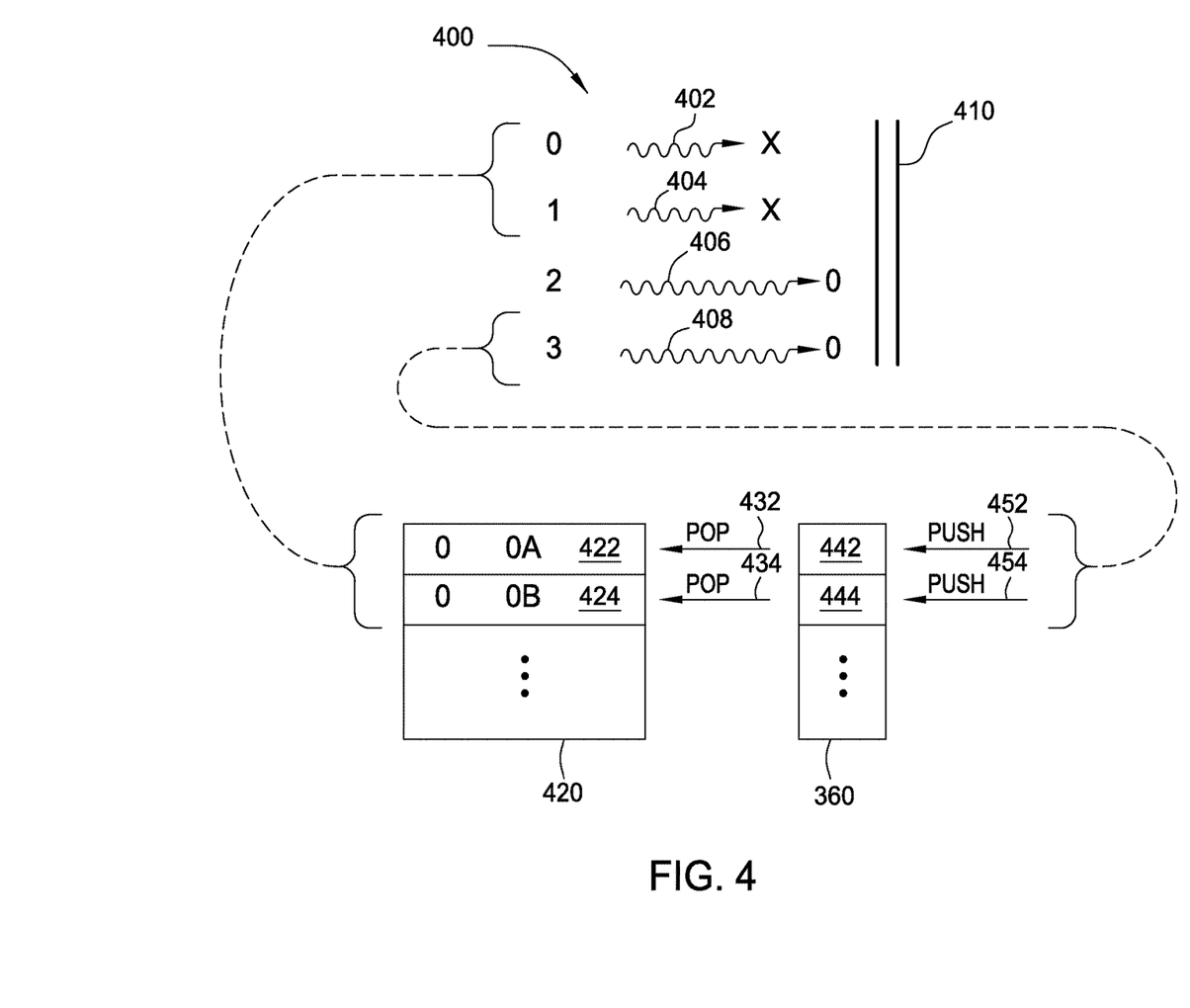
FIG. 4 is a conceptual diagram that illustrates concurrently executing threads to be synchronized, according to one embodiment of the present invention.

FIG. 4 is a conceptual diagram that illustrates concurrently executing threads to be synchronized, according to one embodiment of the present invention. As shown, set 400 of threads includes a thread 402, a thread 404, a thread 406, and a thread 408 configured to progress towards synchronization event 410. Set 400 of threads may represent a CTA, where each of threads 402, 404, 406, and 408 belong to a particular thread group, or set 400 may simply represent a generic collection of threads. Synchronization event 410 represents a condition that, when met, allows the threads within set 400 of threads to progress past the synchronization event and ultimately exit.

In the scenario described herein, threads 402 and 404 progress towards synchronization event 410 until determining that threads 406 and 408 must complete prior to threads 402 and 404 continuing execution. This scenario could arise, for example, because one of threads 402 and 404 previously spawned threads 406 and 408 to perform a processing task and cannot continue execution without data produced by that processing task. Once threads 406 and 408 finish the processing task, threads 402 and 404 may continue execution. The amount of time required by threads 406 and 408 to complete synchronization event 410 may vary, and during that time threads 402 and 404 may each be placed into a "blocked" state until synchronization event 410 is complete. Once the synchronization event is complete, threads 402 and 404 may be released from the blocked state and resume execution.

Thread 402 may enter the blocked state by performing a procedure set forth herein. First, thread 402 acquires a lock on data structure 420. The lock prevents other threads from accessing data structure 420 until thread 402 releases the lock. Then, thread 402 adds entry 422 to data structure 420 that reflects a thread ID associated with thread 402 and the address of a single-entry queue 442 within hardware accelerated queues 360. Data structure 420 could be, e.g., a linked list or other suitable data structure. In FIG. 4, thread 402 has a thread ID of "0" and single-entry queue 442 is associated with address "0A." Thread 402 is configured to add this information to entry 422 within data structure 420.

Thread 402 may then perform a memory fence operation in order to cause any data stored in memory that is associated with thread 402 to be visible to other threads that may require that data. Thread 402 then releases the lock on data structure 420, thereby allowing other threads to access that data structure. Thread 402 then performs a blocking pop operation 432 on single-entry queue 442. Initially, the single-entry queue is empty and so blocking pop operation 432 causes thread 402 to block until that pop operation can be satisfied. In one embodiment, blocking pop operation 432 may timeout, in which case thread 402 may re-try blocking pop operation 432 a threshold number of times before subsequently exiting entirely. When thread 402 is blocked in the fashion described above, thread 402 may release certain resources allocated to that thread, including exec units 302 and/or LSUs 303.

Thread 404 may enter the blocked state by implementing a similar procedure as that set forth above relative to thread 402. In particular, thread 404 may acquire the lock on data structure 420 and then add entry 424 to data structure 420. Similar to entry 422, entry 424 reflects a threadID associated with thread 404 and the address of a single-entry queue 444 within hardware accelerated queues 360. In FIG. 4, thread 404 has a threadID of "1" and single-entry queue 444 is associated with address "0B." Thread 404 is configured to add this information to entry 424.

Thread 404 may then perform a memory fence operation similar to that described above, and then release the lock on data structure 420. Thread 404 then performs a blocking pop operation 434 on single-entry queue 444. Like single-entry queue 442, initially, single-entry queue 444 is empty and so blocking pop operation 434 causes thread 404 to block until that pop operation can be satisfied. In one embodiment, blocking pop operation 434 may timeout, in which case thread 404 may re-try blocking pop operation 434 a threshold number of times before subsequently exiting entirely.

When thread 404 is blocked in the fashion described above, thread 404 may release certain resources allocated to that thread, including exec units 302 and/or LSUs 303.

By implementing the blocking procedure set forth above, when a given thread (e.g. thread 402 or 404) must wait until synchronization event 410 is complete in order to continue execution, that thread may rely on data structure 420 and hardware accelerated queues 360 to enter the blocked state. Each thread configured to execute on SM 310 may be allocated a different single-entry queue to support the blocking procedure described herein. In one embodiment, an initialization thread that executes prior to launching each thread configured to execute on SM 310 may assign a different single-entry queue to each such thread.

During the time that threads 402 and 404 are blocked, threads 406 and 408 may continue to progress towards synchronization event 410. Either of threads 406 or 408 may then determine that synchronization event 410 is complete. For example, as threads 406 and 408 complete execution, each of those threads may decrement a counter. When one of those threads decrements the counter to zero, that thread (again, either 406 or 408) may determine that the synchronization event 410 is complete.

Once the synchronization event 410 is complete, either of threads 406 or 408 may release threads 402 and 404 from the blocked state. In practice, the thread that determined that the synchronization event 410 was complete assumes responsibility for releasing threads 402 and 404 from the blocked state. In the exemplary scenario described herein, thread 408 is configured to release threads 402 and 404 upon determining that synchronization event 410 is complete. However, other implementations may contemplate predetermining a specific thread to release any blocked threads.

Once synchronization event 410 is complete, thread 408 acquires the lock on data structure 420 and accesses entry 422. Thread 408 extracts the address of single-entry queue 442 ("OA") from entry 422 and then performs a push operation 452 to push a data value onto single-entry queue 442. The data value could be, for example, an arbitrary token or a value indicating future actions for thread 402. Push operation 452 satisfies pop operation 432 previously executed by thread 402, and so the data value pushed onto single-entry queue 442 by thread 408 is subsequently popped from single-entry queue 442 and provided to thread 402. Upon satisfaction of pop operation 432, thread 402 is released from the blocked state. Thread 402 may then resume execution, or perform an action indicated by the data value popped from single-entry queue 442.

Thread 408 then proceeds to entry 424 and extracts the address of single-entry queue 444 ("OB") from entry 424 and then performs a push operation 454 to push a data value onto single-entry queue 444. The data value could be, for example, an arbitrary token or a value indicating future actions for thread 404. In similar fashion as described above, push operation 454 satisfies pop operation 434 previously executed by thread 404, and so the data value pushed onto single-entry queue 444 by thread 408 is subsequently popped from single-entry queue 444 and provided to thread 404. Upon satisfaction of pop operation 434, thread 404 is released from the blocked state. Thread 404 may then resume execution, or perform an action indicated by the data value popped from single-entry queue 444. In one embodiment, single-entry queue 444 initially stores a default data value that may be updated by push operation 454. In situations where push operation 454 fails to occur, the default data value may be popped and returned in response to pop operation 434, thereby indicating the failure of push operation 454.

With this approach, threads that must wait for a synchronization event to complete before continuing execution may be placed into a blocked state that requires a reduced amount of SM resources compared to previous polling-type synchronization mechanisms. In particular, with the approach described herein, exec units 302 and LSUs 303 allocated to a thread may be released when that thread is placed into the blocked state. Further, the blocked thread is not required to continuously execute code in the fashion associated with a conventional polling procedure, thereby conserving processing resources. Finally, by relying on hardware accelerated queues 360, the pop and push operations performed by the different threads described herein are significantly faster than would be possible with conventional queues lacking hardware acceleration.

Figure 5:
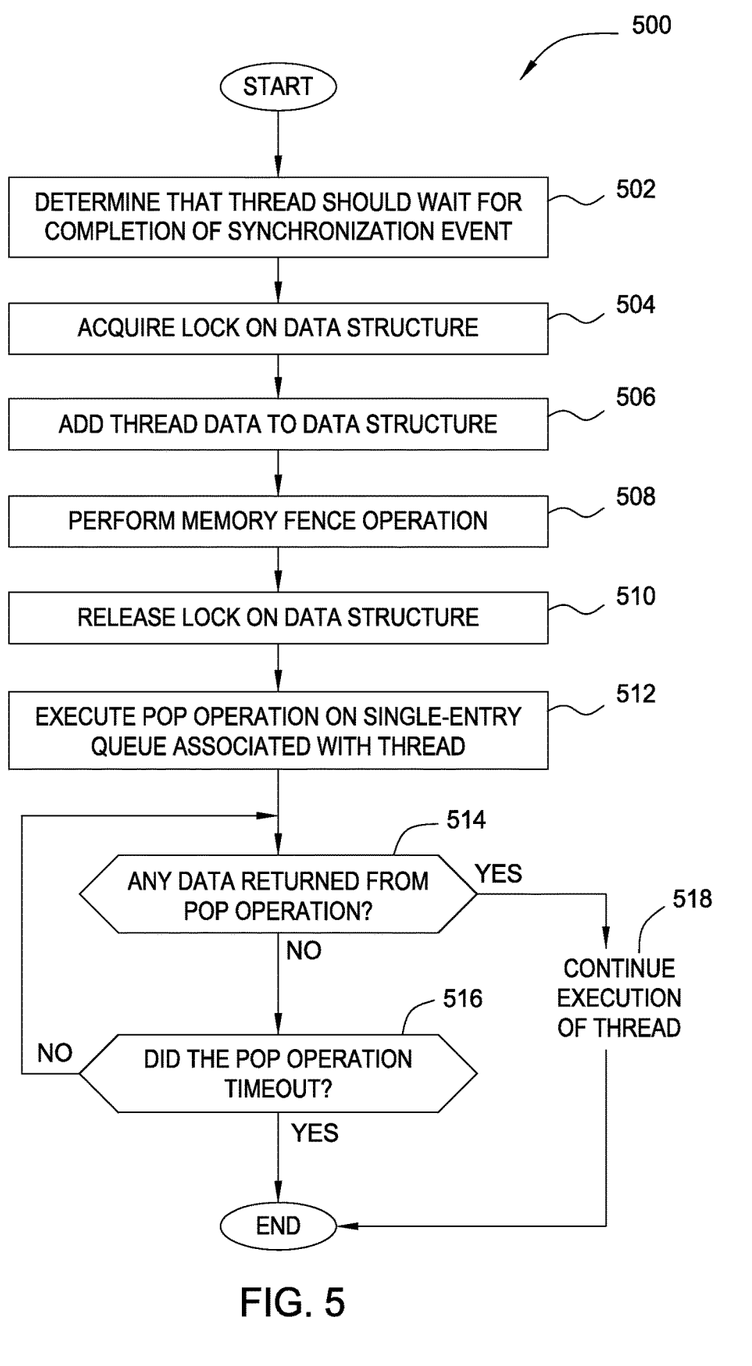
FIG. 5 is a flow diagram of method steps for temporarily blocking the execution of a thread until a synchronization event has completed, according to one embodiment of the present invention.

FIG. 5 is a flow diagram of method steps for temporarily blocking the execution of a thread until a synchronization event has completed, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where thread 402 determines that synchronization event 410 should be completed prior to continuing execution. Synchronization event 410 could represent a condition that should be met, such as the completion of threads 406 and 408, for example.

At step 504, thread 402 acquires a lock on data structure 420. The lock prevents other threads from accessing data structure 420 until thread 402 releases the lock. At step 506, thread 402 adds entry 422 to data structure 420 that reflects a thread ID associated with thread 402 and the address of a single-entry queue 442 within hardware accelerated queues 360. Data structure 420 could be, e.g., a linked list or other suitable data structure.

At step 508, thread 402 performs a memory fence operation in order to cause any data stored in memory that is associated with thread 402 to be visible to other threads that may require that data. At step 510, thread 402 releases the lock on data structure 420, thereby allowing other threads to access that data structure.

At step 512, thread 402 performs blocking pop operation 432 on single-entry queue 442. At step 514, thread 402 determines whether any data was returned from blocking pop operation 432 performed at step 514. Initially, the single-entry queue is empty and so blocking pop operation 432 causes thread 402 to block until that pop operation can be satisfied or until the pop operation times out, as described below in conjunction with step 516. If thread 402 determines that data was returned from blocking pop operation 432, then the method 500 proceeds to step 518 where thread 402 resumes execution. The method 500 then ends.

At step 514, if thread 402 determines that data was not returned from blocking pop operation 432, then the method 500 proceeds to step 516 where thread 402 determines whether blocking pop operation 432 has timed out. At step 516, if thread 402 determines that blocking pop operation 432 has timed out, then the method 500 ends. Thread 402 may also re-try blocking pop operation 432 a threshold number of times before exiting entirely.

At step 516 if thread 402 determines that blocking pop operation 432 has not timed out, then the method 500 returns to step 514 and proceeds as described above. With this approach, thread 402 may repeat steps 514 and 516 until blocking pop operation 432 returns data, thereby releasing thread 402 from the blocked state, or until blocking pop operation 432 times out. Although the method 500 has been described relative to thread 402, other threads, such as e.g. thread 404, may also implement the method 500 in order to temporarily enter the blocked state. Another thread, such as thread 406 or 408, may release a thread from the blocked state by implementing a technique described below in conjunction with FIG. 6.

Figure 6:
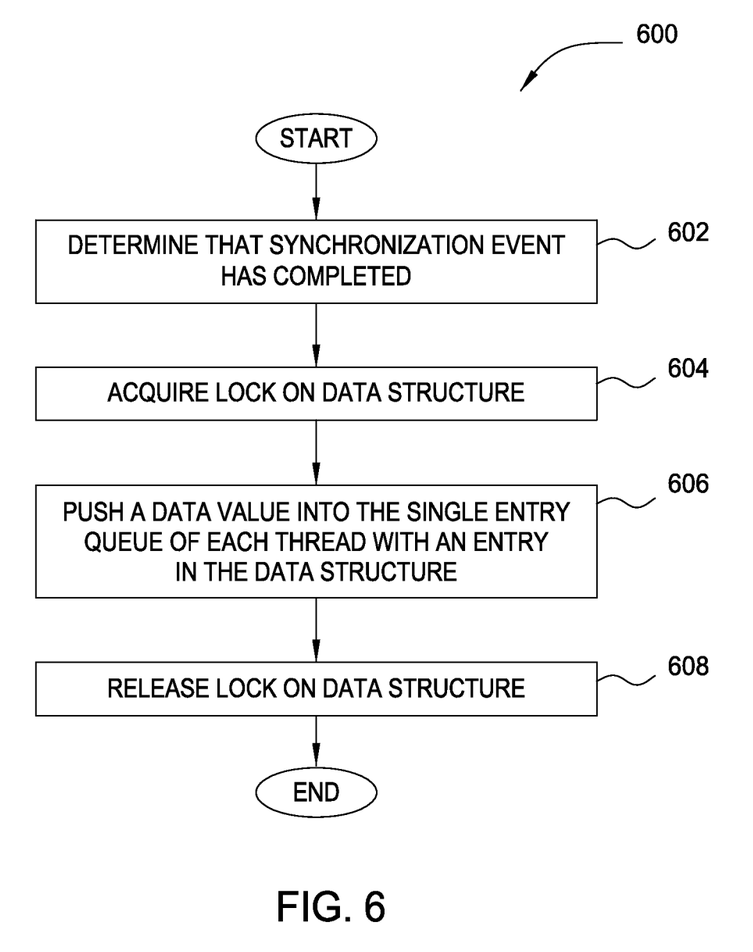
FIG. 6 is a flow diagram of method steps for releasing a thread from a blocked state when a synchronization event has completed, according to one embodiment of the present invention.

FIG. 6 is a flow diagram of method steps for releasing a thread from a blocked state when a synchronization event has completed, according to one embodiment of the present invention. Although the method steps are described in conjunction with the systems of FIGS. 1-4, persons skilled in the art will understand that any system configured to perform the method steps, in any order, is within the scope of the present invention.

As shown, a method 600 begins at step 602, where thread 408 determines that synchronization event 410 has completed. Thread 408 could, for example, complete execution and then decrement a counter. Upon determining that the counter has been decremented to zero, thread 408 may determine that synchronization event 410 is complete. At step 604, thread 408 acquires the lock on data structure 420.

At step 606, thread 408 performs push operation 452 in order to push a data value onto single-entry queue 442. The data value could be, e.g., an arbitrary token value or a code indicating future action for thread 402. In response, single-entry queue 442 may satisfy blocking pop operation 432 and provide the data value to thread 402, thereby releasing thread 402 from the blocked state. At step 608, thread 408 releases the lock on data structure 420. Although the method 600 has been described in relative to thread 408 releasing thread 402 from the blocked state, either of threads 406 or 408 may implement the method 600 in order to release either of threads 402 or 404 from the blocked state.

By implementing the method 600 described herein, as well as executing the method 500 described above in conjunction with FIG. 5, threads executing on SM 310 are provided with a resource-efficient synchronization mechanism capable of operating with greater speed compared to previous approaches and with lower power and resource overhead.

In sum, a first thread is placed into a blocked state by causing the thread to perform a blocking pop operation on a hardware-accelerated, single-entry queue. When a synchronization event completes, a second thread may release the first thread from the blocked state pushing a data value onto the hardware accelerated, single-entry queue. The push operation satisfies the blocking pop operation, and the first thread is released. Advantageously, threads executing on a parallel processing unit may synchronize operations without consuming the excessive power and processing resources required by conventional synchronization mechanisms.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for synchronizing a first thread with one or more second threads, the method comprising:
    determining that the one or more second threads should complete a synchronization event prior to the first thread completing execution;
    causing the first thread to store an address of a first queue in a data structure;
    causing the first thread to execute a blocking pop operation on the first queue, wherein, when executing the blocking pop operation, the first thread causes one or more hardware resources allocated to the first thread to be released, enters a blocked state, and pauses execution;
    in response to the one or more second threads completing the synchronization event, causing one of the second threads to access the address of the first queue from the data structure and push a first data value onto the first queue;
    determining that the first thread has completed executing the blocking pop operation and that the first data value has been returned from the first queue to the first thread; and
    exiting the blocked state to resume execution of the first thread.

2. The computer-implemented method of claim 1, wherein the address of the first queue is stored in the data structure prior to causing the first thread to execute the blocking pop operation.

3. The computer-implemented method of claim 2, wherein the data structure comprises a linked list of entries, and each entry in the linked list corresponds to a different thread to be synchronized with the one or more second threads.

4. The computer-implemented method of claim 1, further comprising, after the one of the second threads pushes the first data value onto the first queue, causing the data value to be returned from the first queue to the first thread, wherein the data value allows the blocking pop operation to be completed.

5. The computer-implemented method of claim 1, wherein the data value represents a success code indicating that the one or more second threads have completed the synchronization event.

6. The computer-implemented method of claim 1, wherein the data value represents a failure code indicating that the blocking pop operation has failed to complete before a threshold amount of time has elapsed, and wherein exiting the blocked state to resume execution of the first thread comprises completing execution of the first thread without the first thread performing additional processing operations.

7. The computer-implemented method of claim 1, wherein the first queue comprises a single-entry queue.

8. The computer-implemented method of claim 1, wherein the first thread and the one or more second threads are configured to execute in parallel with one another within a parallel processing unit (PPU).

9. A non-transitory computer-readable medium storing program instructions that, when executed by a processor, cause the processor to synchronize a first thread with one or more second threads, by performing the steps of:
   determining that the one or more second threads should complete a synchronization event prior to the first thread completing execution;
   causing the first thread to store an address of a first queue in a data structure;
   causing the first thread to execute a blocking pop operation on the first queue, wherein, when executing the blocking pop operation, the first thread causes one or more hardware resources allocated to the first thread to be released, enters a blocked state, and pauses execution;
   in response to the one or more second threads completing the synchronization event, causing one of the second threads to access the address of the first queue from the data structure and push a first data value onto the first queue;
   determining that the first thread has completed executing the blocking pop operation and that the first data value has been returned from the first queue to the first thread; and
   exiting the blocked state to resume execution of the first thread.

10. The non-transitory computer-readable medium of claim 9, wherein the address of the first queue is stored in the data structure prior to causing the first thread to execute the blocking pop operation.

11. The non-transitory computer-readable medium of claim 10, wherein the data structure comprises a linked list of entries, and each entry in the linked list corresponds to a different thread to be synchronized with the one or more second threads.

12. The non-transitory computer-readable medium of claim 9, further comprising the step of, after the one of the second threads pushes the first data value onto the first queue, causing the data value to be returned from the first queue to the first thread, wherein the data value allows the blocking pop operation to be completed.

13. The non-transitory computer-readable medium of claim 9, wherein the data value represents a success code indicating that the one or more second threads have completed the synchronization event.

14. The non-transitory computer-readable medium of claim 9, wherein the data value represents a failure code indicating that the blocking pop operation has failed to complete before a threshold amount of time has elapsed, and wherein the step of exiting the blocked state to resume execution of the first thread comprises completing execution of the first thread without the first thread performing additional processing operations.

15. The non-transitory computer-readable medium of claim 9, wherein the first queue comprises a hardware-accelerated single-entry circular queue.

16. The non-transitory computer-readable medium of claim 9, wherein the first thread and the one or more second threads are configured to execute in parallel with one another within a parallel processing unit (PPU).

17. The non-transitory computer-readable medium of claim 9, wherein the first queue comprises a single-entry queue.

18. The non-transitory computer-readable medium of claim 9, wherein causing the first thread to execute the blocking pop operation comprises causing a first identifier to be added to the data structure, the first identifier identifying the first thread, and wherein determining that first thread has completed executing the blocking pop operation comprises causing the first thread to be notified based on the first identifier in response to the first data value being pushed onto the first queue.

19. The non-transitory computer-readable medium of claim 18, wherein causing the first thread to execute the blocking pop operation comprises acquiring a lock on the data structure and performing a memory fence operation to allow access to the first identifier added to the data structure.

20. The non-transitory computer-readable medium of claim 9, wherein the first queue comprises a hardware-accelerated queue.

21. A computing device configured to synchronize a first thread with one or more second threads, including:
   a processor configured to:
      determine that the one or more second threads should complete a synchronization event prior to the first thread completing execution;
      cause the first thread to store an address of a first queue in a data structure;
      cause the first thread to execute a blocking pop operation on the first queue, wherein, when executing the blocking pop operation, the first thread causes one or more hardware resources allocated to the first thread to be released, enters a blocked state, and pauses execution;
      in response to the one or more second threads completing the synchronization event, cause one of the second threads to access the address of the first queue from the data structure and push a first data value onto the first queue;
      determine that the first thread has completed executing the blocking pop operation and that the first data value has been returned from the first queue to the first thread; and
      exit the blocked state to resume execution of the first thread.

22. The computing device of claim 21, further including:
   a memory unit coupled to the processor and storing program instructions that, when executed by the processor, cause the processor to:
      determine that the one or more second threads should complete the synchronization event,
      cause the first thread to store an address of a first queue in a data structure,
      cause the first thread to execute the blocking pop operation on the first queue,
      in response to the one or more second threads completing the synchronization event, cause one of the second threads to access the address of the first queue from the data structure and push a first data value onto the first queue,
      determine that the first thread has completed executing the blocking pop operation and that the first data value has been returned from the first queue to the first thread, and
      exit the blocked state to resume execution of the first thread.

23. A method, comprising:
- determining that one or more second threads should complete a synchronization event prior to a first thread completing execution;
- causing the first thread to execute a blocking pop operation on a first queue, wherein the first queue comprises a single-entry queue, and when executing the blocking pop operation, the first thread causes one or more hardware resources allocated to the first thread to be released, enters a blocked state, and pauses execution;
- in response to the one or more second threads completing the synchronization event, causing one of the second threads to push a first data value onto the first queue;
- determining that the first thread has completed executing the blocking pop operation and that the first data value has been returned from the first queue to the first thread; and
- exiting the blocked state to resume execution of the first thread.

24. A non-transitory, computer-readable medium storing instructions that, when executed by a processor, cause the processor to perform the steps of:
- determining that one or more second threads should complete a synchronization event prior to a first thread completing execution;
- causing the first thread to execute a blocking pop operation on a first queue by causing a first identifier identifying the first thread to be added to a data structure, acquiring a lock on the data structure, and performing a memory fence operation to allow access to the first identifier added to the data structure, wherein, when executing the blocking pop operation, the first thread causes one or more hardware resources allocated to the first thread to be released, enters a blocked state, and pauses execution;
- in response to the one or more second threads completing the synchronization event, causing one of the second threads to push a first data value onto the first queue;
- determining that the first thread has completed executing the blocking pop operation and that the first data value has been returned from the first queue to the first thread by causing the first thread to be notified based on the first identifier in response to the data value being pushed onto the first queue; and
- exit the blocked state to resume execution of the first thread.

* * * * *